June 5, 1956
N. C. WELLS
2,748,719
GAS SEPARATORS FOR WELL PUMPS
Filed Oct. 7, 1953
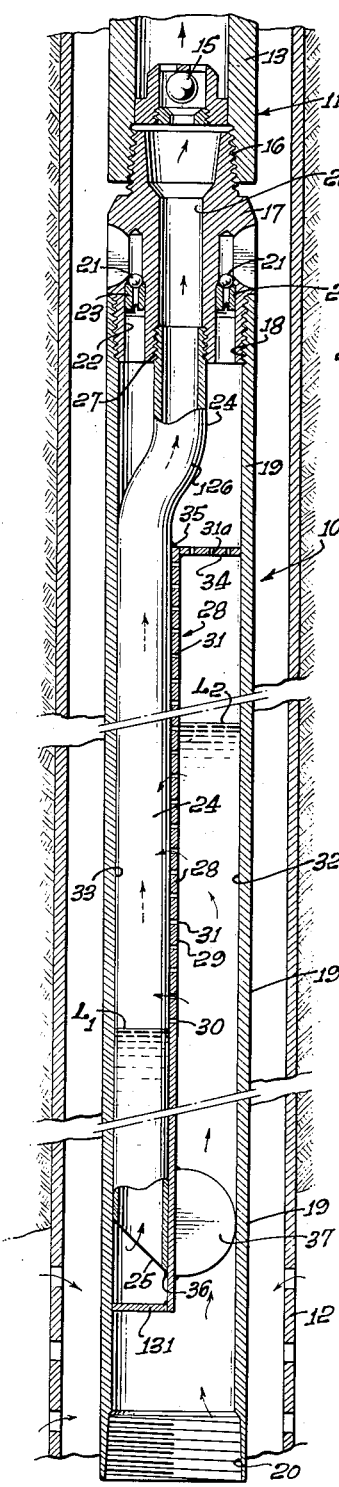
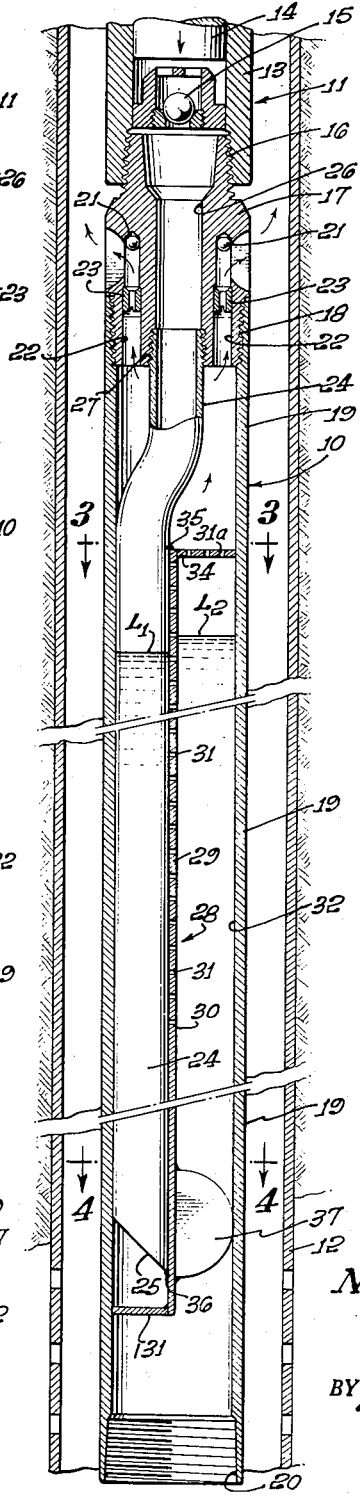
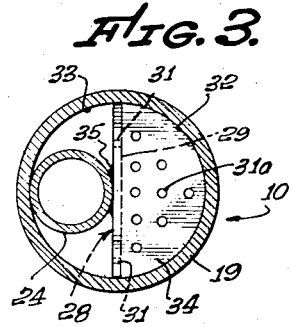
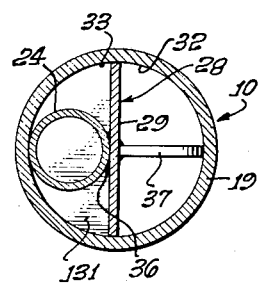
Norman C. Wells,
INVENTOR.
BY
ATTORNEY.

United States Patent Office 2,748,719
Patented June 5, 1956

2,748,719

GAS SEPARATORS FOR WELL PUMPS

Norman C. Wells, Long Beach, Calif., assignor to Agate Corporation, Los Angeles, Calif., a corporation of California Application October 7, 1953, Serial No. 384,729

13 Claims. (Cl. 103—203)

This invention relates to improved gas separators for use in conjunction with well pumps.

For many years, the oil industry has sought a gas separator which is capable of effectively and completely removing gases from the fluid flowing to a well pump. Though various types of separators have heretofore been proposed for this purpose, none has proven capable, while submerged in the liquid within a well, of effectively removing most or all of the gases from the well liquid flowing to the pump, while at the same time passing enough liquid to the pump to allow a maximum rate of production of the well. As a result, most wells having appreciable quantities of gas or froth in their fluid have been produced at relatively slow rates.

The general object of the present invention is to provide a device which is able to effectively separate gas from the fluid flowing to a well pump, and which will do so even when the well fluid takes the form of a light froth having a very high gas content. Particularly contemplated is a separator of this type which will function when completely and deeply submerged in the well liquid and which has a sufficiently large fluid handling capacity to permit a conventional reciprocating pump to draw a full charge of liquid upon each stroke. A further object of the invention is to design a separator having the above operating characteristics, and yet which is structurally extremely simple and has a minimum number of working parts.

Separating devices constructed in accordance with the invention function on a principle which is basically different from the principles of prior devices intended for this purpose. Specifically, I have found that the most difficult froths can be broken by producing in the separating tool a column of gases, and then passing the froth or gassy well fluid directly through and in contact with this gas column for separation into its liquid and gaseous constituents. Such intimate contact between the well fluid and the gases in the gas column causes the froth or gassy fluid to instantly break down, so that its liquid content may be taken by the pump, while the gaseous content is merely added to the gas column. The column gases may then be vented to the exterior of the separator, preferably past suitable check valves, for return into the well.

To effect the desired gas separation, I provide suitable means for directing the well fluid into the gas column. These means may include a fluid directing baffle, which may have a perforated screen-like portion acting to divide the fluid flow into a plurality of individual streams, each of which is very intimately contacted and surrounded by the gases of the gas column. The pump section may be utilized to produce a force serving to withdraw fluid from one side of the baffle in a manner such that fluid flows through the baffle from its second side to the first side and into an upper gas space at that first side. The baffle may extend vertically within an inner chamber of the separator, and may have a lower imperforate portion adapted to direct the fluid upwardly through an upper perforated portion thereof. The separated liquid may be withdrawn from the device through an outlet, typically a liquid discharge pipe depending in the separating chamber, which outlet or pipe may communicate with the separating chamber at a location lower than the perforated portion of the baffle, and opposite its imperforate portion.

In accordance with the teachings of my copending application Ser. No. 268,258, filed January 25, 1952, on Well Pump Filters, now Patent No. 2,591,887, issued April 8, 1952, the device preferably is so constructed that the liquid level beneath the gas column is always maintained above the point at which the liquid outlet to the pump communicates with the separating chamber, to thus continuously maintain a liquid seal at the liquid outlet acting to prevent discharge of gases with the liquid. Also as taught in that invention, the device may be constructed to positively prevent complete venting of all of the gases in the gas column from the device under any circumstances. These results may be achieved by predetermined loading of the gas venting check valves, in a manner positively controlling the extent of venting, and thus maintaining the liquid level within a desired range.

The above and other features and objects of the present invention will be better understoodt from the following detailed description of the typical embodiment illustrated in the accompanying drawing, in which:

Fig. 1 is a vertical section through a gas separator carried at the lower end of a conventional well pump, and shown as it appears during the pump upstroke, typically near the upper end of that stroke;

Fig. 2 is a view corresponding to Fig. 1 but showing the condition of the apparatus during the pump downstroke; and Figs. 3 and 4 are transverse sections taken on lines 3—3 and 4—4 respectively of Fig. 2.

In the drawing, I have shown at 10 a gas separating device connected to the lower inlet end of a conventional reciprocating type well pump 11. The pump and gas separating device are shown positioned within an oil well having the usual perforated liner 12 through which oil flows from the surrounding earth formation into the well. The pump includes a vertically extending cylinder 13 containing a vertically reciprocable piston 14, which acts to draw well fluid upwardly past a lower inlet check valve 15. As will be understood, the pump is connected to the lower end of a production string, through which the pumped liquid is forced upwardly to the surface of the earth.

The device 10 is threadedly connected at 16 into the lower end of pump barrel 13, and acts to separate gas from the well liquid before the liquid passes upwardly into the pump and production string. This gas separating device includes an upper head 17, to the lower end of which is threadedly connected at 18 a tubular or cylindrical vertically extending body 19. The side wall of body 19 is preferably imperforate along its entire vertical extent. At its lower end, tubular body 19 is open to provide a bottom inlet through which the well fluid may flow upwardly into the interior of the tool. If desired, the lower end of body 19 may be threaded, as at 20, to allow connection of an additional tool or inlet device to the lower end of the body if desired.

During the time that the well liquid or froth is contained within the interior of body 19, gas separates out from the liquid or froth and rises upwardly within the body, to discharge to the exterior of the device 10 past a number of gas discharge or venting valves 21. These check valves may comprise spherical balls of predetermined weight, positioned within the upwardly extending portions of a number of circularly spaced gas discharge passages 22 formed in head 17. Each of the passages 22 first extends upwardly from a point of communication with the interior of body 19 at the underside of head 17, and then extends laterally outwardly to the outside of the head for venting the gases to the exterior of the device. The check valves 21 may seat downwardly against individual seat elements 23 mounted within the vertically extending portions of the passages 22.

Liquid is discharged from the interior of body 19 upwardly to pump 13 through a liquid discharge tube 24, which is connected into the underside of head 17 and projects downwardly within body 19 to a lower open inlet end 25 of the tube. The upper end of tube 24 may be threadedly connected at 27 into head 17 at a central location, to communicate with a central passage 26 in the head leading upwardly to the pump. At a location 126 beneath head 17, tube 24 may be deformed laterally, to extend downwardly within body 19 at an eccentrically positioned or laterally offset location adjacent one side of the wall of body 19. The tube is preferably imperforate between its uppermost end and its lower inlet end 25, so that liquid may flow into the tube only at its lower end. If desired, that lower inlet end of the tube may be cut at an inclination as shown.

In flowing from the lower inlet end 20 of body 19 to a lower inlet end 25 of tube 24, the well liquid must pass through a baffle plate 28, which functions to greatly facilitate the separation of gas from the liquid, particularly where the gas and liquid are present primarily as a froth. This baffle 28 has a main portion 29 extending vertically within body 19, and extending diametrically across the interior of the body to separate the body into two semicircular passages or chambers 32 and 33. A lower part of portion 29 of baffle 28 is imperforate, up to a point 30, beyond which the baffle is perforated to pass liquid and gas through a number of apertures 31. At its lower end, baffle 28 has a semicircular imperforate horizontally extending portion 131, positioned beneath the lower open end 25 of tube 24, and semicircularly engaging the inner wall of body 19 to prevent fluid flow into chamber 33 except by passage through baffle apertures 31. At its upper end, the baffle 28 has a second horizontally extending semicircular portion 34 engaging the inner wall of body 19 and extending across the upper end of chamber 32, to prevent the movement of any relatively large bodies upwardly toward seat elements 23. This upper horizontal portion 34 of the baffle may contain apertures 31a corresponding to apertures 31 in the vertical part of the baffle.

Baffle 28 is desirably secured to and carried by discharge 24, as by welding these parts together at 35 and 36. The baffle need not be directly connected to body 19, but instead is desirably held in proper axial position within body 19 merely by virtue of the attachment of the baffle to tube 24, which in turn is threadedly connected at its upper end 27 into head 17. To assemble the device, the tube 24 and baffle 28 as a unit may first be threadedly connected into head 17, following which body 19 may be slipped upwardly onto the outside of tube 24 and the baffle, and then threadedly connected to the head at 18. In this case, the baffle is formed sufficiently precisely to peripherally engage the interior of body 19 along the entire vertical extents of the opposite sides of the vertical portion 29 of the baffle, and along the entire extents of the semicircular edges of horizontal portions 131 and 34 of the baffle. The engagement of the edges of baffle 28 with the wall of body 19 should be sufficiently tight to prevent fluid passage about the edges of the baffle, and particularly about its lower imperforate portions, so that the fluid in passing between chamber 32 and 33 must go through apertures 31 and 31a of the baffle. In order to positively hold the lower imperforate portions of baffle 28 in tight peripheral engagement with the wall of body 19, the lower portion of the baffle may carry a laterally projecting vertically extending brace member 37, which is engageable with the wall of body 19 at a location opposite the center of the lower portion of the baffle, in a manner preventing lateral movement of the baffle and tube 24 in the body.

During the upstroke of pump piston 14, liquid is drawn into tube 24 through its lower inlet end 25 for passage upwardly to the pump. As the liquid is thus drawn upwardly through tube 24, the liquid level within chamber 33 to the left of baffle 28 as seen in the figures falls, as for instance to the level L1 indicated in Fig. 1 (which represents the condition of the apparatus at or near the end of the piston upstroke). At the same time, the liquid level within the second vertical chamber 32 also falls, but at a slower rate in view of the restriction offered by apertures 31 in baffle 28. The liquid level L2 in chamber 32 is thus above liquid level L1 in chamber 32 during the piston upstroke. By virtue of this difference in liquid levels L1 and L2, liquid from chamber 32 flows into chamber 33 in the form of a large number of streams passing through apertures 31 in the baffle. Such injection of these streams of liquid into the upper gas space within chamber 33 at a location above the liquid level in chamber 33 necessitates passage of the liquid streams directly through the upper gas area, and the resultant intimate contact of the liquid with the gas greatly enhances separation of any contained gas from the liquid, to maximize the effectiveness of gas separation in the device. This effect is particularly desirable where the well fluid is in the form of froth, from which gas is hard to separate. The separated gas of course accumulates within the upper portion of body 19, while the liquid passes into tube 24 for delivery to the pump.

During the pump downstroke, the accumulated gas within the upper interior of body 19 is vented to the exterior of the body past check valves 21 as a result of the difference between the hydrostatic pressure of the fluid and gas column in the body 19 and the hydrostatic pressure of the corresponding portion of the column at the outside of the body. At the same time, this difference in hydrostatic pressure causes the liquid or froth level within body 19 to rise, both within chamber 32 and chamber 33, typically to the levels indicated in Fig. 2. The device is then ready for a subsequent piston upstroke, to repeat the cycle of operations already described.

In the particular form of the invention shown in the drawing, the apertures 31 and 31a in baffle 28 are desirably sufficiently small that the restriction to fluid flow therethrough is great enough to assure the attainment of a substantial difference in the liquid levels L1 and L2 in chambers 33 and 32 respectively during the piston upstroke. At the same time, the combined area of the apertures should be great enough to enable the device to pass relatively large quantities of liquid to the pump. For best operating results, I find it desirable to form the apertures 31 and 31a of a diameter between about ⅛" and ⅜", preferably about ¼", with the centers of the apertures typically being about ⅜" apart.

In order to assure most effective separation of gas from the liquid or froth in the present device, I find it highly desirable to predetermine the degree of loading of gas venting check valves 21 in accordance with the teachings of my copending application Serial No. 268,258, filed January 25, 1952, on "Well Pump Filters," now Patent No. 2,591,887, issued April 8, 1952. This predetermination of the loading of the check valves may be effected by merely controlling the weights of the check valves and their areas subjected to pressure. These valves may in the first place be so designed as to resist opening movement to an extent preventing complete discharge of all of the gas from body 19 under any operating circumstances, or in other words assuring maintenance of a column of unexpelled gas in the upper portion of the chamber at all times. The presence of such a gas column above the liquid in body 19 creates a liquid gas interface in the device, which in accordance with known principles encourages a continuing separation of entrained gas from the liquid, and enables the passage of liquid directly through the gas space in the manner previously discussed. When a gas column is present above the body of liquid, any entrained gas in the liquid tends to come to the surface of the liquid in the form of bubbles, which then break at the surface (the liquid-gas interface), and thus free the gas for entry into the gas column.

The loading of check valves 21 is also so selected as to limit the extent to which the liquid levels within the device may fall, and thereby prevent any discharge of gases to the pump with the well liquid. Specifically, the check valves, while being loaded sufficiently heavily to assure continuous maintenance of a column of unexpelled gas in the upper portion of body 19, are at the same time loaded sufficiently lightly to under all circumstances maintain the liquid level in the body, and particularly in chamber 33, above the lower inlet opening 25 of liquid discharge tube 24 (that is, above the liquid outlet leading from body 19). In this way, a highly effective liquid seal is provided at the liquid outlet 25, positively preventing access of any of the separated gases to pipe 24 leading to the pump.

With specific reference to the manner in which check valves 21 control the liquid level or levels in the device, it is noted that as gases accumulate in the upper portion of the chamber an unbalanced condition is set up between the hydrostatic columns at the inside and outside of the body 19. This unbalanced condition evidences itself in the exertion of a differential pressure tending to open check valves 21. As will be understood, this differential pressure is caused by the weight of an unbalanced portion of the liquid column horizontally opposite the inner gas column. In designing a particular filter, it is necessary to so design the check valves, baffle plate, and tube 24 that the differential hydrostatic pressure will always reach a sufficient value to open valves 21 and to vent some of the gas from body 19 before the liquid level in chamber 33 can fall to the level of liquid outlet 25. In designing the various parts to function in this manner within an oil well, the density of the well fluid which produces the differential pressure for actuating valves 21 may be considered as ranging from .05 lb. per sq. in. per ft. (for oil and gas froth) to .46 lb. per sq. in. per ft. (for salt water). The device should be constructed to function properly in any fluid falling within this range.

For best operating results, I find it desirable to so construct the device that the minimum liquid level L1 to which the liquid falls within chamber 33 during normal operation of the apparatus is approximately at the location of point 30 between the imperforate and perforated portions of baffle 28. The highest point to which the liquid levels may rise (see Fig. 2), as determined by the loading of valves 21, should desirably be not higher than the upper end of the baffle.

While the dimensions of the various parts of the device may of course be varied within a wide range as long as the above characteristics are maintained, I will for the sake of completeness give below the dimensions of a particular tool which has actually been constructed and has proven highly effective for separating gas from a light oil froth:

1. Internal diameter of body 19, 2.50 inches.
2. Vertical distance between seats of valves 21 and lower opening 25 of tube 24, 8'–0"
3. Vertical distance between seats of check valves 21 and highest liquid level at which check valves will open by hydrostatic pressure in a well containing light oil froth at the outside of the tool (density of froth .05 lb. per sq. in. per ft.) 6 inches.
4. Minimum differential pressure at which check valves 21 open, 0.10 lb. per sq. in.
5. Vertical extent of baffle 28, 7'–0"
6. Vertical extent of lower imperforate portion of baffle, 3'–0"
7. Vertical extent of upper perforated portion of baffle, 4'–0"
8. Apertures 31 and 31a of ¼" diameter, centers spaced apart ⅜" and staggered
9. Vertical spacing of point 30 on baffle below seats of valves 21, 5'–2"

I claim:

1. A gas separator comprising a body adapted to be carried beneath a well pump, said body forming a chamber through which well liquid is directed in passing to said pump and acting to accumulate and contain an enclosed column of gases separated from the well liquid, fluid directing means for directing partially liquid and partially gaseous well fluid from the outside of said body into the gas column in said chamber to flow through said gas column so that the liquid and gaseous components of the well fluid are separated by contact with said gases of the column, check valve means adapted to vent gases from said gas column to the exterior of said body separately from the liquid, but preventing reverse fluid flow into the body through said check valve means, and liquid outlet means for separately discharging the liquid to said pump.

2. A gas separator as recited in claim 1, in which said first mentioned means are constructed to direct a plurality of separate streams of said well fluid into said gas column at a plurality of different locations.

3. A gas separator as recited in claim 1, in which said fluid directing means comprise a screen in said chamber containing a plurality of apertures through which said well fluid flows, said apertures being sufficiently restricted to fluid flow therethrough to maintain different liquid levels at opposite sides of the screen during the pump upstroke so that fluid passing through the screen apertures from beneath the liquid level at one side enters a gas column above the liquid level at the other side.

4. A gas separator as recited in claim 1, in which said liquid discharging means comprise a liquid outlet communicating with a lower body of liquid in said chamber at a location spaced beneath said valve means and not communicating with the chamber at any point above said location, said check valve means being loaded sufficiently lightly to assure maintenance of the liquid level in said chamber above said liquid outlet location at all times during operation of the separator.

5. A gas separator as recited in claim 4, in which said valve means are loaded sufficiently heavily to prevent complete venting of the gases from said chamber and to thereby at all times maintain an unvented column of gases in the chamber.

6. A gas separator as recited in claim 5, in which said fluid directing means comprise a screen in said chamber containing a plurality of apertures through which said well fluid flows, said apertures being sufficiently restricted to fluid flow to maintain different liquid levels at opposite sides thereof during the pump upstroke so that fluid passing through the screen apertures from beneath the liquid level at one side enters a gas column above the liquid level at the other side.

7. A gas separator comprising a vertically extending hollow body adapted to be carried beneath a well pump and through which well liquid flows in passing to the pump, baffle means in said body having a vertically extending portion and dividing said body into first and second vertically extending spaces, means forming an inlet for introducing partially liquid and partially gaseous well fluid into the first of said spaces, said body being constructed to enclose and maintain in an upper portion thereof a column of gases separated from the well liquid, means for venting said gases from the body separately from the liquid, means forming a liquid outlet leading to the pump and communicating with the second of said spaces at but not above an outlet location which is spaced below said venting means, and is lower than said column of gases, said baffle means containing aperture means through which said liquid and gaseous fluid flows from said first side of the baffle means into the gas column at the second side of the baffle means.

8. A gas separator as recited in claim 7, in which said baffle means has an upper perforated portion and a lower imperforate portion requiring passage of the well fluid through the perforated portion, and said outlet communicates with the second side of the baffle opposite said imperforate portion thereof.

9. A gas separator as recited in claim 7, in which said liquid outlet comprises a tube extending downwardly within said body communicable at an upper end with the pump and communicating with the interior of the body at said outlet location spaced beneath said venting means, said venting means comprising check valve means for discharging gases from an upper portion of the body to the exterior thereof.

10. A gas separator as recited in claim 9, in which said check valve means are loaded sufficiently heavily to at all times maintain a column of unvented gas in the body, and being loaded sufficiently lightly to at all times maintain a liquid level above said outlet location at said second side of the baffle means.

11. A gas separator as recited in claim 10, in which said aperture means comprise a large number of apertures formed in an upper portion of said baffle means, said baffle means having a lower imperforate portion opposite said point of communication of the liquid outlet tube with the interior of the body and requiring passage of said fluid through said upper apertures in flowing past the baffle means.

12. A gas separator as recited in claim 9, in which said aperture means comprise a large number of apertures formed in an upper portion of said baffle means, said baffle means having a lower imperforate portion opposite said point of communication of the liquid outlet tube with the interior of the body and requiring passage of said fluid through said upper apertures in flowing past the baffle means.

13. A gas separator comprising a body adapted to be carried beneath a well pump, said body forming a chamber through which well liquid is directed in passing to said pump and acting to accumulate and contain an enclosed column of gases separated from the well liquid, means for directing partially liquid and partially gaseous well fluid from the outside of said body into the gas column in said chamber to flow through said gas column so that the liquid and gaseous components of the well fluid are separated by contact with said gases of the column, vent means for passing gases from said gas column to the exterior of said body separately from the liquid, and liquid outlet means for separately discharging the liquid to said pump, said fluid directing means including a screen in said chamber containing a plurality of apertures through which said well fluid flows from one side of the screen to the other, said apertures being sufficiently restricted to fluid flow therethrough to maintain different liquid levels at opposite sides of the screen during the pump upstroke so that fluid passing through the screen apertures from beneath the liquid level at one side enters a gas column above the liquid level at the other side.

References Cited in the file of this patent

UNITED STATES PATENTS

| | | |
|---|---|---|
| 1,697,321 | Marsh | Jan. 1, 1929 |
| 2,271,002 | Fosnaugh | Jan. 27, 1942 |
| 2,440,506 | Furse | Apr. 27, 1948 |
| 2,525,897 | Greene | Oct. 17, 1950 |
| 2,587,333 | Kelley | Feb. 26, 1952 |
| 2,652,130 | Ferguson | Sept. 15, 1953 |
| 2,665,643 | Greene | Jan. 12, 1954 |
| 2,665,664 | Wells | Jan. 12, 1954 |
| 2,674,192 | Coberly | Apr. 6, 1954 |